United States Patent [19]

Coburn

[11] Patent Number: 4,823,153

[45] Date of Patent: Apr. 18, 1989

[54] CLEANING SYSTEM FOR NON-IMPACT PRINTER

[75] Inventor: Richard J. Coburn, East Hartford, Conn.

[73] Assignee: Moore Business Forms, Inc., Grand Island, N.Y.

[21] Appl. No.: 131,753

[22] Filed: Dec. 11, 1987

[51] Int. Cl.⁴ .............................................. C01D 15/00

[52] U.S. Cl. .................................... 346/160.1; 355/15

[58] Field of Search .................. 355/3 DD, 3 BE, 15; 346/160.1, 153.1; 400/119, 701, 702, 702.1; 101/DIG. 13; 369/71-74

[56] References Cited

U.S. PATENT DOCUMENTS

| | | | |
|---|---|---|---|
| 4,264,912 | 0/1981 | Coburn et al. | 346/160.1 |
| 4,401,305 | 8/1983 | Katayama et al. | 355/3 DP |
| 4,423,354 | 0/1983 | Kegelman | 346/160.1 |
| 4,638,339 | 0/1987 | Coburn et al. | 346/160.1 |
| 4,642,661 | 0/1987 | Dean, II | 346/160.1 |
| 4,651,605 | 0/1987 | Dean, II | 346/160.1 |

*Primary Examiner*—Arthur G. Evans
*Attorney, Agent, or Firm*—Nixon & Vanderhye

[57] ABSTRACT

In an electrographic printing apparatus, a dielectric belt cleaning system includes counter-rotating pairs of adjoining cylinders mounted to a housing. A vacuum source forces the dielectric belt in free span against the surfaces of the cylinders which are covered by a directional raised nap. Residual toner on the belt is dislodged and drawn through a low pressure zone between each pair of cylinders leading to a filtered discharge outlet. The brushes are cleaned by their interengagement along adjacent cylinder surfaces where the cylinder brushes mesh and also between each cylinder brush and a rake therefor fixed to the housing.

16 Claims, 3 Drawing Sheets

CLEANING SYSTEM FOR NON-IMPACT PRINTER

FIELD OF THE INVENTION

This invention generally relates to an electrographic printing apparatus or direct charge deposition imaging system. More particularly, this invention concerns an apparatus for removing toner from the charged surface of a dielectric image belt after image transfer to paper and before depositing the charge for the next image to be printed.

BACKGROUND OF THE INVENTION

Non-impact offset printers require cleaning of the image surface after transferring an image to the paper, and prior to depositing the charge for subsequent images to be printed. Typical transfer processes are not 100% effective, leaving a small amount of toner used to develop the image on the surface of the drum or belt used as the image surface. If this residual toner is not removed, it will contaminate the printer mechanisms and degrade subsequent images.

It also must be understood that cleaning of the dielectric belt in a direct charge deposition imaging system must be done while a very strong electrostatic image remains, because one cannot normally discharge the image surface before cleaning.

In contrast, conventional photoconductive imaging systems use light to reduce the electrical charge holding the residual toner to the imaging surface, and a soft, long nap, rotating brush, or soft plastic scraper to remove the bulk of the residual toner. Ion projection imaging systems that use a drum and pressure transfer use a hard scraper to clean the drum surface. Photoconductive and ion projection imaging systems do not require contact with the image surface other than for cleaning the image transfer. Consequently, these systems are somewhat tolerant of residual toner or paper dust on the image surface after cleaning.

In a direct charge deposition imaging system of the type contemplated by this invention, contact is made between the image surface and the print head to maintain the necessary clearance gap between the print head pins and the surface of the dielectric material of the belt. Any residual material on the belt surface will tend to accumulate at the belt/head interface causing an accumulation of material that can lift the belt off the print head increasing the pin/belt gap to a level that can cause print degradation. For this reason, the cleaning function in a direct charge deposition printing system is more critical than in other non-impact printing systems and is extremely sensitive.

In addition, the charge pattern generating the image in the direct charge deposition process is imposed on a simple dielectric material with no photoelectric properties, so exposure to light to discharge the surface has no effect. In fact, the residual image charge is directly blocked by the tightly bonded residual toner that did not transfer to the paper in the transfer zone, thus making pre-cleaning corona treatment ineffectual.

The use of a scraper to remove toner from the belt of a direct charge deposition printer results in a damage to the dielectric surface of the belt. In use, material can build up on the surface of the scraper to the extent that it lifts the belt away from the scraper and allows a portion of the belt to pass the scraper without being cleaned.

The use of a long-nap rotating brush (normally having bristles about 0.400 inches in length) to clean the belt surface presents two problems. First, since the image charge is still present on the belt, the toner clings to the belt and is simply moved aside as the tip of a soft bristle moves across the surface. Second, if the toner does cling to the bristle, or become trapped within the nap, the depth of the nap is such that it is very difficult to remove the toner from the brush with the normal vacuum and "flicker bar" typically used to clean these brushes. As a result, some of the toner is carried back to the surface of the belt and is redeposited on the residual charge pattern on the belt as the belt exits the cleaning station. In addition, while running a printer at the high speed (about 12 inches per second) contemplated for this invention, frictional heating at the "flicker bar" and long nap brush interface can cause local fusing of toner particles on the "flicker bar" and brush fibers degrading cleaning performance.

OBJECTS OF THE INVENTION

Accordingly, it is a primary object of this invention to effect essentially complete removal of all residual toner from a dielectric belt of a non-impact, direct charge deposition electrographic offset printing system.

It is a further object of this invention to so remove all residual toner in such an electrographic offset printing system without damaging the surface of the dielectric belt.

It is yet another object of this invention to eliminate distortion of latent images on the dielectric belt of a direct charge deposition imaging system caused by residual toner which undesirably changes the required distance between the surface of the belt and print head pins.

A still further object of this invention is to improve the quality of the latent image by essentially complete removal of all residual toner from the surface of a dielectric belt in such an electrographic offset printer.

It is an additional object of this invention to effect complete cleaning of brushes of a belt-cleaning apparatus of such an electrographic offset printer and to avoid heat buildup that could cause fusing of toner in the apparatus.

It is yet a further object of this invention to use brushes to clean residual toner from the surface of the dielectric belt in such an electrographic offset printer without requiring the electric charge of the belt to be dissipated.

Other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the way in which the principle of the invention is employed.

SUMMARY OF THE INVENTION

The present invention, in its simplest form, provides a pair of counter-rotating cylinders aligned in parallel relation to one another and disposed in perpendicular relation to the path of movement of an endless loop dielectric belt. The outer surface of each cylinder is formed by a brush with a raised directional nap oriented opposite to the direction of rotation of that cylinder.

The cylinder brushes are contiguous along a longitudinally extending zone of engagement parallel to the major axes of the cylinders. Each cylinder brush also engages a rake fixed to a perforated surface of a vacuum housing. A dielectric belt of an electrographic offset printer spans the outer brush surfaces of the cylinders and is wrapped about a predetermined portion of each of those cylinders. The belt is held in contact with the cylinders by belt support rollers located on a side of the belt opposite the side engaged with the cylinders for cleaning and also by a vacuum source which creates low pressure zones between the belt and cylinders and between the cylinders and vacuum housing. Counter-rotation of the cylinders dislodges residual toner from the belt and directs loose toner into the low pressure zones. Air drawn through the low pressure zones from between the cylinders and between each cylinder and the vacuum housing lifts toner from the brushes and carries that toner through perforations in the vacuum housing to a discharge outlet. Contact of the raised-nap brushes along the outer surfaces of the cylinders and contact between each of the cylinder brushes and the rakes of the vacuum housing releases toner in the low pressure zones and effectively cleans the cylinder brush surfaces prior to their rotating back to the belt.

DETAILED DESCRIPTION OF THE INVENTION

Figure 1:
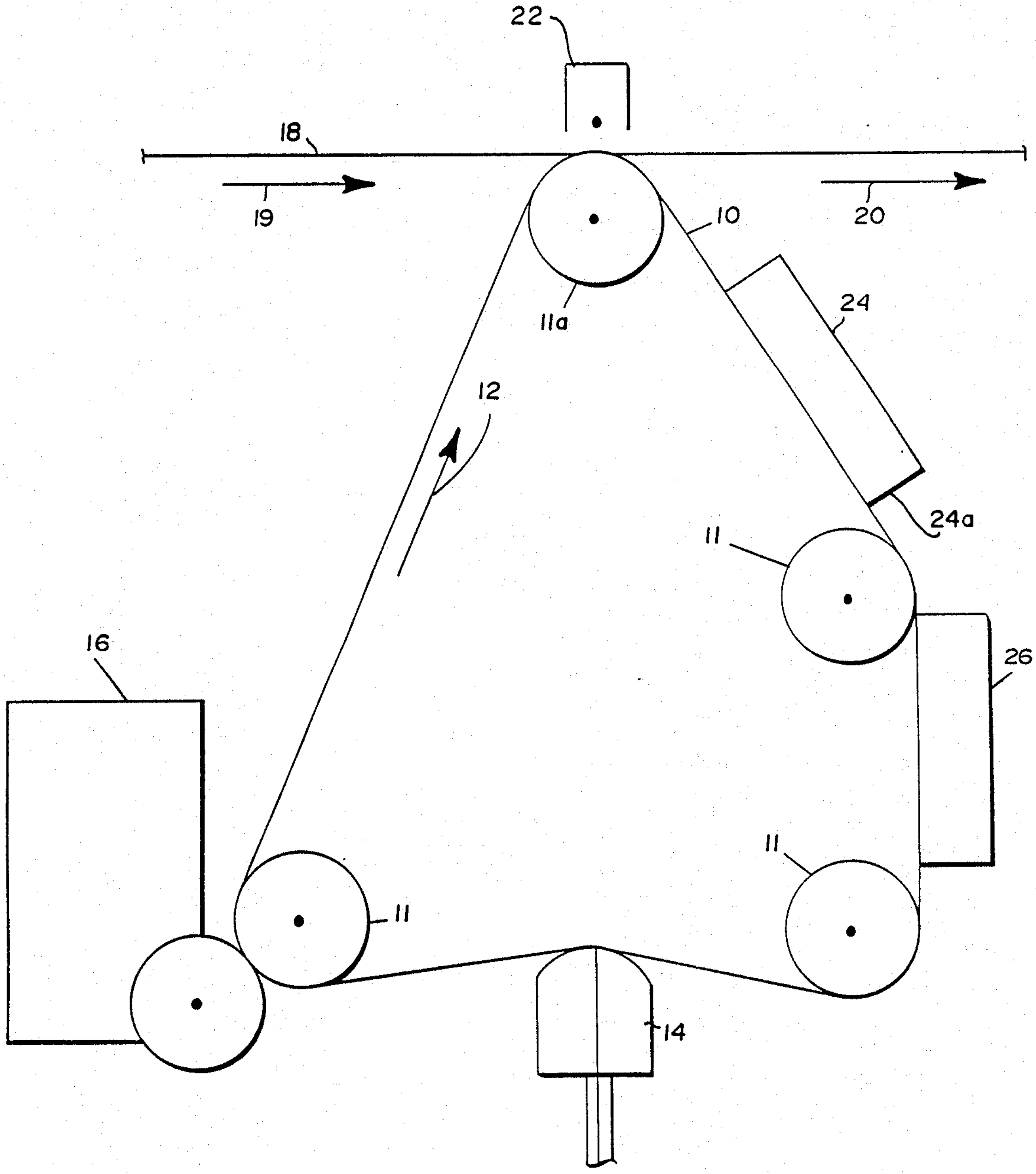
FIG. 1 schematically illustrates an electrographic printer including a cleaning station of this invention.

Turning first to FIG. 1 and the schematic illustration of a non-impact, direct charge deposition electrographic printer including the present invention in a preferred embodiment, a suitable dielectric image endless loop belt 10 (such as that shown in co-pending application Ser. No. 07/131,828 entitled Belt and Belt Support Drive for Non-Impact Direct Charge Electrographic Printer and assigned to the assignee of the present invention) is supported on a plurality of rollers 11, one or more of which may be driven to produce movement of belt 10 in the direction of arrow 12. A print head 14 of the preferred embodiment of this apparatus is preferably of a type disclosed in my U.S. Pat. No. 4,638,339 entitled "ELECTROGRAPHIC CHARGE DEPOSITION APPARATUS", issued Jan. 20, 1987 and assigned to the assignee of the present invention. Print head 14 serves to create a latent electrostatic image on belt 10 in accordance with the voltages applied to pins of print head 14.

In accordance with conventional techniques, a suitable toner is supplied to belt 10 by developer apparatus generally designated 16, which toner is attracted in accordance with an electrostatic charge on belt 10. A continuous sheet of paper 18 is suitably driven in the direction of arrows 19 and 20 so as to pass roller 11*a*, which roller is directly opposite and supportive of belt 10 at transfer corona 22. After an image has been transferred to paper 18, belt 10 continues to cleaning station 24 of this invention.

Following cleaning, dielectric belt 10 continues through conditioning station 26 to prepare dielectric belt 10 to receive the image from print head 14, which conditioning station is preferably constructed in accordance with co-pending application Ser. No. 07/131,928 entitled "CONDITIONING APPARATUS FOR NON-IMPACT, DIRECT CHARGE ELECTROGRAPHIC PRINTER BELT" and assigned to the assignee of this invention. In accordance with conventional techniques, paper 18 with the image transferred thereto by the transfer corona 22, continues to a suitable image fixing or fusing station (not shown) which apparatus can be constructed in accordance with U.S. Pat. No. 4,642,661 entitled "PRINTER WITH DRIVE ON SWINGING PLATFORM" and assigned to the assignee of the present invention.

Figure 2:
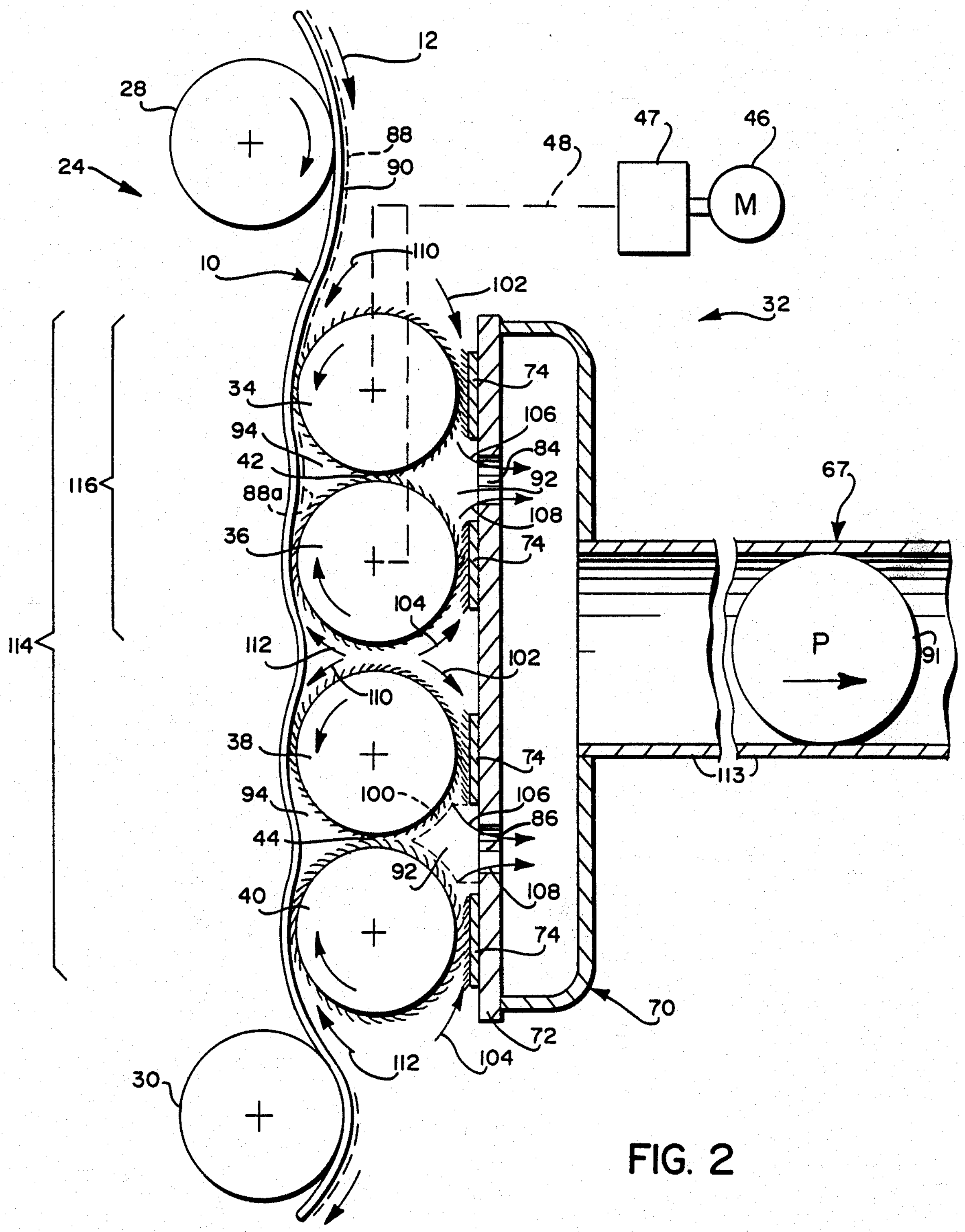
FIG. 2 is a cross-sectional view of the cleaning station of this invention.

As seen in FIG. 2, charged dielectric belt 10 carries particles of toner and paper dust 88 left as residue after transfer of a latent image from belt 10 to the surface of the continuous paper sheet 18. In the preferred illustrated embodiment, belt 10 moves through cleaning station 24 with upstream and downstream support rollers respectively shown at 28 and 30 along the belt path of movement. The belt 10 is trained between the rollers 28 and 30, which are disposed on one side of the belt 10, and a cleaning head generally designated 32 disposed on the other side of the belt 10 which is to be cleaned. Belt support rollers 28, 30 are rotatably mounted on a housing 24*a* (FIG. 1) with longitudinally extending axes of the rollers perpendicular to the path of movement of the dielectric belt. The belt support rollers 28, 30 accordingly direct the belt into engagement with cleaning head 32 which is positioned in a free span of belt 10 between belt support rollers 28, 30.

In the preferred illustrated embodiment, the cleaning head 32 includes two pairs of rigid counter-rotating cylinders, 34, 36 and 38, 40 rotatably mounted on housing 24*a* with the cylinders disposed in parallel relation to one another and to belt support rollers 28, 30. The cylinders of each pair are in surface-to-surface engagement along a longitudinally extending zone 42 and 44 between opposite longitudinal ends of the cylinders. It will be understood that the cylinders of each pair 34, 26 and 38, 40 are power operated to counter-rotate in synchronism with one another and may be driven at a predetermined speed by a conventional drive motor 46 and gear box 47. A suitable drive connection to the cylinder, such as at 48 in FIG. 2, will be understood to be provided for each pair of cylinders to rotate them at the same surface speed but in opposite angular directions.

Figure 3:
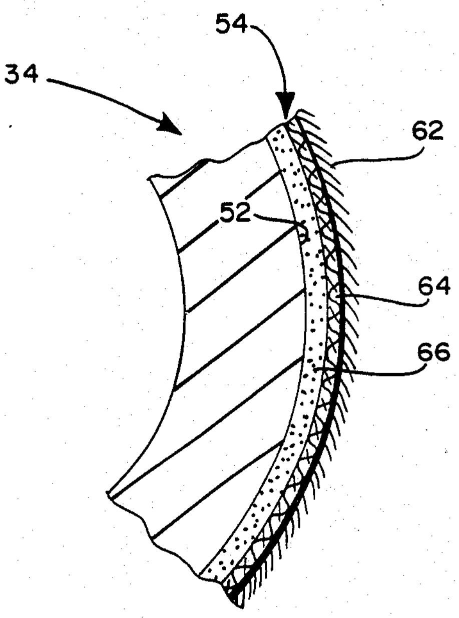
FIG. 3 is an enlarged cross-sectional view of a brush fixed to a cylinder of the cleaning station of FIG. 2.

Each cylinder is identical in cross-section, and cylinder 34 is shown in cross-section in FIG. 3. An outer surface 52 of each cylinder is covered by a fabric or brush 54. Each brush has filaments 62 fixed to a backing or base 64 which is, in turn fixed by adhesive 66 to outer surface 52 of its cylinder 50. Each brush 54 preferably is constructed with a directional raised nap wherein the filaments 62 of each brush have a common orientation relative to a line drawn tangent to the cylinder at each filament's fixed end at the adhesive backing 64. Each filament extends to a free end in a direction opposite the rotation of its respective cylinder.

So that the nap of each brush lays down upon contact with the belt 10, the direction of orientation of each brush filament 62 from its base 64 is generally opposite the angular direction of movement of the cylinder surface 52 to which the brush 54 is attached. A fabric which has been found to satisfactorily function as an effective brush 54 is a cotton base non-woven fabric called "V-1 'PS'" made by J. I. Morris Company, Southbridge, Mass., with a precision cut nap having a filament length of approximately 0.020 to 0.040 inches.

Figure 4:
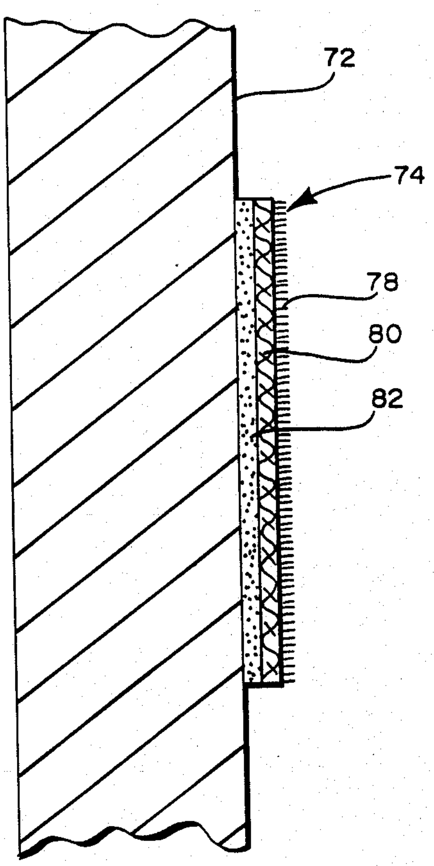
FIG. 4 is an enlarged cross-sectional view of a rake fixed to a vacuum plate of the cleaning station of FIG. 2.

As shown in the drawings, the exceptional cleaning capability exhibited by the subject invention has been found to be enhanced by wrapping belt 10 over substantial areas of the brushes 54. To create a force normal to the belt path of movement forcing the belt 10 onto the brushes and effecting a wrap of that belt 10 onto each brush of the cylinders, a filtered vacuum system is provided at 67. A substantially flat perforated plate 72 of a vacuum housing 70 is proximate the surfaces of the cylinders 34, 36 and 38, 40. As seen in FIG. 4, a short nap non-woven flocked rake 74 for each cylinder brush 54 is fixed to vacuum plate 72. Filaments 78 (FIG. 4) of each rake may be substantially perpendicular to their supporting base 80 of fabric which base is secured by adhesive 82 to plate 72. The rake nap filaments 78 may be rayon or the like precisely cut to length of about 0.020 to 0.040 inches. The preferred fabric base is cotton. The fabric sold by J.I. Morris Company and called "Alphalap 'PS'" has been found to work satisfactorily as the above described rakes. The brush surface 54 of each cylinder 34, 36 and 38, 40 is in engagement with a rake 74 as described above with each rake 74 being fixed to the vacuum plate face along the length of each cylinder. Perforations in the vacuum plate 72 are shown at 84 and 86 located between the rakes 74 for each pair of cylinders 34, 36 and 38, 40.

Residual toner 88 and other particles such as paper dust on the dielectric belt surface 90 are carried by the belt 10 to the first pair of counter-rotating cylinders 34, 36. The direction of rotation of the first cylinder 34 of the first pair of cylinders to contact the belt 10 corresponds with the direction of motion of the belt 10. In the preferred embodiment, to effectively loosen and sweep toner 88 from the belt, the surface speed of the rotating cylinders 34, 36 is desirably twice the surface speed of the moving dielectric belt 10. Such an arrangement, where the resulting relative motion of cylinders 34, 34, and the belt 10 is in the direction of belt movement, additionally minimizes the net drag on the dielectric belt 10.

Accordingly, the brush 54 fixed to the first cylinder 34 loosens residual toner 88 along the belt surface 90. More specifically, when that toner 88 is loosened from the belt 10, some of the toner 88 is redistributed on the belt 10 and some toner 88 is dislodged and carried by the brush 54 of the first cylinder 34 away from the belt 10. A pump 91 of the vacuum system 67 provides negative pressure of between 15 and 40 inches of water in high vacuum zones shown at 92 of each cylinder pair. Zones 92 are defined by each pair of cylinders and the vacuum plate 72. High vacuum zones 92 are further sealed at opposite outboard ends of the cylinder pairs by vacuum seal blocks, one being shown in broken lines at 100. Vacuum seal blocks 100 may be fixed to the vacuum housing 70 to extend between the ends of each cylinder pair 34, 36 and 38, 40. The force of vacuum draws a total air flow volume between about 10 and about 40 cubic feet per minute of air (STP) through perforations 84, 86 in the vacuum plate 72.

Partial vacuum zones 94 are defined by the belt 10 and each pair of cylinders 34, 36 and 38, 40. These zones 94 are exposed to ambient pressure at their opposite outboard ends. The path of air flow into partial vacuum zones 94, as shown by arrows 110 and 112, is between the cylinder brushes 54 and dielectric belt 10 in the same direction as the rotating brush 54. The path of air flow into high vacuum zones 92 is both (a) from partial vacuum zones 94 through interfaces 42, 44 between the cylinder brushes and (b) between each cylinder brush and its rake 74, as shown by arrows 102 and 104, each in a direction opposite the angular direction of brush rotation. Air drawn into the high vacuum zones 92 passes through the perforations 84, 86 in the vacuum plate 72 for discharge through a vacuum conduit 113 to a filtered outlet, not shown.

Belt 10 has a circumferential length greater than its straight line path of movement. It will be understood that a slack compensating tension control, not shown, may be provided in accordance with conventional techniques such that the vacuum draws belt 10 into a desired wrapped configuration 114 against the cylinder brushes 54. A wrapped configuration here means the belt 10 conforms to a portion of the circumferentially extending surface of each cylinder 34, 36 and 38, 40. By virtue of this construction, the exposure of one side 90 of the belt surface to the short nap brush 54 of each cylinder is thereby increased and maximizes the agitating and cleaning effect of the brushes 54. The brush filaments 62 are effectively pressed against the belt surface 90, thereby overcoming the undesirable tip bypass effects of conventional long nap brushes.

Toner 88 loosened from the belt 10 by the first cylinder 34, 38 of each pair is also lifted from the belt 10 by air drawn through the partial vacuum zones 94 and then passes between the cylinders 34, 36 and 38, 40 and toward the high vacuum zones 92 produced by vacuum source 67. Toner 88*a* remaining on or redeposited on the belt 10 will contact the brush 54 of the second cylinder 36, 40 of each pair of cylinders moving in a direction opposite that of the belt 10 at a relative speed three times the belt surface speed to effectively remove any remaining toner from the belt.

The short nap brushes 54 of the cylinders 34, 36 and 38, 40 in turn are each fully cleaned by the air rushing through the high vacuum zones 92 in the flow paths fully described above and significantly augmented by direct brush-to-brush contact at 42 and 44 and by contact between each brush 54 and its short nap rake 74 which serves as a brush cleaning pad. The upstream rake 74 for cylinders 34, 38 further functions as a partiseal for ensuring a high vacuum within zone 92. Accordingly, the large surface area presented by the multiplicity of fibers of the rake 74 and the rush of air flow through the contact area effectively keep all surface temperatures well below the fusing temperature of the toner.

Any toner 88 remaining on the belt 10 after passing through the wrap area 116 of the first cylinder pair 34, 36 should be removed by the second pair of downstream counter-rotating cylinders 38, 40 located in the path of movement of the belt 10, it being understood that this second cylinder pair 38, 40 operates the same as the first pair of cylinders 34, 36.

As will be apparent to persons skilled in the art, various modifications, adaptations and variations of the foregoing specific disclosure can be made without departing from the teaching of this invention.

I claim:

1. Cleaning apparatus for a non-impact, direct charge deposition electrographic printer belt comprising
a housing, a pair of cylinders supported for counter-rotation on the housing in side-by-side relation, the cylinders each having a brush on its outer surface, vacuum means for creating a high vacuum zone between the cylinders, and a dielectric belt having one side providing a toner-carrying image surface, the belt being supported for movement along a path spanning the cylinders with their brushes in direct surface engagement with the one side of the belt, the pair of cylinders including a first cylinder upstream of a second cylinder with the first cylinder rotating in an angular direction corresponding to the path of movement of the belt upon engagement therewith, the vacuum means creating a force for maintaining the one side of the moving belt in surface engagement with the brushes of the counter-rotating cylinders for cleaning toner from said one side of the belt.

2. The apparatus of claim 1 wherein the housing further includes a perforated plate, wherein the cylinders are mounted on the housing adjacent the plate, and wherein the vacuum means is in communication with the plate.

3. The apparatus of claim 1 wherein the vacuum means includes a pump and conduit means connecting the pump and housing for creating the high vacuum zone between the cylinders.

4. The apparatus of claim 3 wherein the pump creates a second partial vacuum zone between the belt and the cylinders for forcing the belt into surface-to-surface engagement with the brushes of the counter-rotating cylinders.

5. The apparatus of claim 1 wherein the brush of each cylinder is in surface-to-surface engagment with the brush of the other cylinder.

6. The apparatus of claim 1 wherein the brush of each cylinder is formed of a nonwoven fabric having a generally uniform nap of short filaments.

7. The apparatus of claim 6 wherein the filaments of the nap are about 0.020 to about 0.040 inches in length.

8. The apparatus of claim 6 wherein the nap of each cylinder brush is oriented in a common direction with each filament extending from a fixed end to a free end in a direction generally opposite the angular direction of rotation of its cylinder such that the nap of each cylinder brush lays down upon contact with the belt.

9. The apparatus of claim 2 further including a pair of cleaning pads fixed to the perforated plate of the housing and forming an elongated rake for each cylinder brush, each rake extending between opposite longitudinal ends of its respective cylinder, each rake being in surface-to-surface engagement with its cylinder brush for removing any toner being carried by that brush.

10. The apparatus of claim 9 wherein the rakes are each formed of a nonwoven fabric including a multiplicity of filaments of a generally uniform length between about 0.020 and about 0.040 inches.

11. The apparatus of claim 5 wherein the housing further includes a perforated plate, and wherein air sealing means is provided at opposite longitudinal ends of each cylinder, the air sealing means cooperating with the plate and the cylinders to form a vacuum chamber for said high vacuum zone, the chamber being of generally triangular cross section defined by the plate and confronting cylinder surfaces adjacent that plate.

12. The apparatus of claim 11 wherein the vacuum means further includes a discharge outlet downstream of the plate, the vacuum means creating an air flow from the interface between each rake and its respective cylinder and into the vacuum chamber for dislodging and cleaning toner from the cylinder brushes for delivery to the discharge outlet.

13. The apparatus of claim 12 further including a pair of cleaning pads fixed to the perforated plate of the housing and forming an elongated rake for each cylinder brush, each rake extending between opposite longitudinal ends of its respective cylinder, each rake being in surface-to-surface engagement with its cylinder brush for removing any toner being carried by that brush, the rake and concentrated air flow cooperating to dissipate frictional heat and to maintain surface temperature of the brushes and rake below the melting temperature of the toner.

14. The apparatus of claim 1 further including a cylinder drive means for counter-rotating the cylinders in synchronism with one another.

15. The apparatus of claim 14 wherein the cylinder drive means counter-rotates the cylinders at a surface speed approximately two times the belt speed.

16. The apparatus of claim 1 further including a pair of belt support rollers respectively in upstream and downstream relation to the cylinders with each of the belt support rollers positioned on a side of the belt opposite the one side of the belt.

* * * * *

UNITED STATES PATENT AND TRADEMARK OFFICE
CERTIFICATE OF CORRECTION

PATENT NO. : 4,823,153

DATED : April 18, 1989

INVENTOR(S) : Walter C. DEAN II

It is certified that error appears in the above-identified patent and that said Letters Patent is hereby corrected as shown below:

On the cover sheet of the patent, Richard J. Coburn, East Hartford, Conn., should be deleted as inventor and replaced by Walter C. Dean II, Simsbury, Conn.

Signed and Sealed this

Twenty-sixth Day of December, 1989

*Attest:*

JEFFREY M. SAMUELS

*Attesting Officer* — *Acting Commissioner of Patents and Trademarks*